US008145629B2

(12) United States Patent
Labossiere et al.

(10) Patent No.: US 8,145,629 B2
(45) Date of Patent: Mar. 27, 2012

(54) METHOD AND SYSTEM FOR BUSINESS REPORTING

(75) Inventors: Paul R. Labossiere, Gloucester (CA); Godfrey Lee, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 1595 days.

(21) Appl. No.: 10/857,172

(22) Filed: May 28, 2004

(65) Prior Publication Data

US 2006/0010102 A1    Jan. 12, 2006

(51) Int. Cl.
*G06F 7/00* (2006.01)

(52) U.S. Cl. .................. 707/722; 707/783

(58) Field of Classification Search ............... 707/104.1, 707/722, 783
See application file for complete search history.

(56) References Cited

U.S. PATENT DOCUMENTS

| | | | | |
|---|---|---|---|---|
| 5,437,024 A * | 7/1995 | French | .................. | 707/10 |
| 5,710,900 A * | 1/1998 | Anand et al. | .................. | 715/764 |
| 6,031,625 A * | 2/2000 | Sherman et al. | .................. | 358/1.18 |
| 6,081,810 A * | 6/2000 | Rosenzweig et al. | ...... | 707/104.1 |
| 6,233,583 B1 * | 5/2001 | Hoth | .................. | 707/102 |
| 6,247,008 B1 * | 6/2001 | Cambot et al. | .................. | 707/3 |
| 6,341,286 B1 * | 1/2002 | Kawano | .................. | 707/101 |
| 6,393,422 B1 * | 5/2002 | Wone | .................. | 707/10 |
| 6,539,370 B1 * | 3/2003 | Chang et al. | .................. | 707/2 |
| 6,694,316 B1 * | 2/2004 | Langseth et al. | .................. | 707/10 |
| 6,704,742 B1 * | 3/2004 | Huth et al. | .................. | 707/102 |
| 7,013,418 B1 * | 3/2006 | Revsin et al. | .................. | 714/748 |
| 2001/0034679 A1 * | 10/2001 | Wrigley | .................. | 705/35 |
| 2002/0023158 A1 * | 2/2002 | Polizzi et al. | .................. | 709/227 |
| 2002/0091681 A1 * | 7/2002 | Cras et al. | .................. | 707/3 |
| 2003/0061229 A1 * | 3/2003 | Lusen et al. | .................. | 707/102 |
| 2004/0139452 A1 * | 7/2004 | Hope et al. | .................. | 719/318 |
| 2005/0234886 A1 * | 10/2005 | Mohraz et al. | .................. | 707/3 |

OTHER PUBLICATIONS

David Platte, All About the BCA Publisher: Who's sending your information, Xenon Consulting Inc., 2002.*
Oracle9iAS Report Services, "Publishing Reports to the Web, Release 2 (9.0.2)," Oracle, Feb. 2002 (Oracle).*
Oracle9iAS Report Services, "Publishing Reports to the Web, Release 2 (9.0.2)," Oracle, Feb. 2002.*

* cited by examiner

*Primary Examiner* — Tim T Vo
*Assistant Examiner* — Jau-Shya Meng
(74) *Attorney, Agent, or Firm* — Shumaker & Sieffert, P.A.

(57) ABSTRACT

The invention introduces a system and method for bursting (or segmenting) reports in a business intelligence system having a report authoring application. The method comprises defining a query, defining a burst specification, storing the burst specification, integrating the burst specification with the query, sending the integrated query to a database to produce a data stream, producing from the data stream a business report having columns and items, bursting the business report based on the burst specification to produce one or more burst reports, and distributing the one or more burst reports according to the burst specification.

20 Claims, 5 Drawing Sheets

METHOD AND SYSTEM FOR BUSINESS REPORTING

FIELD OF THE INVENTION

The invention is in the domain of the production of reports in a business intelligence system.

BACKGROUND OF THE INVENTION

Reporting is the largest and fastest-growing component of the business intelligence (BI) market The business intelligence systems used in most companies have a wide sperm of user classes and needs. The majority of end-users are simply report consumers who need basic reports delivered on a regular basis either in bard-copy, or, increasingly, in the form of email. A smaller audience needs reports that deliver more inactivity and customization. The smallest group of end-users—often referred to as power users—need full interactivity, the ability to create custom or ad hoc reports and queries, and drill-through navigation.

There is an ongoing desire to streamline the creation, deployment, and modification of reports, and to provide report authors and others with tools that allow openness, flexibility, and scalability. Ideally one reporting solution for the entire enterprise would be usable by a variety of people and be available for use throughout an organization. IT must be able to offer the reporting capability to the various users without overwhelming its resources.

Modern business intelligence systems provide report writing and modification tools for both professional IT and business authors that help extend authoring to a broad audience. Using these tools, reports are easy to create by dragging and dropping report data elements.

With these traditional report authoring solutions, authors create and deploy the report users send them back for changes. In addition, most report writing applications follow a rigid linear format that forces users to use archaic methods like customer coding and duplication of files (one per language), if-then-else statements to modify the format per language, and over-lay text stings with if-then-else formatting options to hide all but one overlay. Also, producing reports in different languages can require the generation of a series of separate reports, or even one report that must later be translated. Few solutions address issues such flexible report creation, so that in most cases making even minor changes means recreating the entire report from scratch, or worse, recreating an entire report series. As a result, many organizations already have a reporting backlog. Producing multiple reports from data is inefficient for the end user, wasteful of the network bandwidth, and has poor overall performance.

Any enterprise-wide solution must be able to solve these issues, or wide deployment of reporting will swamp IT.

External solutions to this problem have been used, but these require separate managing, and there are consequent inefficiencies. One example is the BCA Publisher by XENON CONSULTING INC, more details of which are available in the document "All About the BCA Publisher: Who's sending your information", also available here: www.bonymaug.com/Presentations/9-10-02/About the BCA Publisher-DCP.ppt.

SUMMARY OF TH INVENTION

The invention introduces a system and method for but (or segmenting) reports, which addresses one or more of the aforementioned problems. The term 'bursting' is used because it is analogous to bursting printed output when printing is done on continuous stationery: each section or page of a report is 'burst apart', or separated, from the next and these separate sections can then be forwarded to different recipients. Thus the provision of subsets of a general (or generic) report is referred to as bursting. A repot-bursting feature is valuable because it allows the break-up of reports for efficient distribution of specific information to authorized users.

In accordance with an aspect of the present invention there is provided a reporting method, for use in a business intelligence system having a report authoring application with a user interface, comprising The steps of defining a query, defining a burst specification, storing the burst specification, integrating the burst specification with the query, sending the integrated query to a database to produce a data stream, producing from the data stream a business report having columns and items, busing the business repot based on the burst specification to produce one or more burst reports, and distributing the one or more burst reports according to the burst specification.

It is a usual and convenient 'shorthand' to refer to the operation of generating a report based on a previously prepared report specification as "running a report".

The provision of a report-bursting feature means that, instead of running multiple versions of reports for different consumers, organizations are able to run one report and automatically separate it into personalized report pages for distribution to each consumer. This minimizes the load on the database and reduces the report processing time. For example, a daily sales report to be distributed to all sales representatives within a company is run with one query to the database. The report is then automatically distributed to the individual end users, with each sales representative simply receiving the data that they are authorized to see, specifically their territory's figures and the total sum.

BRIEF DESCRIPTION OF THE DRAWINGS

Embodiments of the invention are described with reference to the following drawings;

FIG. 6($b$) shows steps of bursting a report according to burst specification and incoming data stream.

DETAILED DESCRIPTION OF EMBODIMENTS OF THE INVENTION

In embodiments of the invention, a report query is authored appropriately and a report engine partitions (or bursts) the result sets into discreet reports, each of which is distributed according to data obtained from the query itself, the data therefore being included in the stream of data used to produce the report. Thus bursting, as implemented in embodiments of the invention, is a means of specifying the partitioning of reports and the distribution lists related to these partitioned reports in a dynamic fashion.

Figure 1:
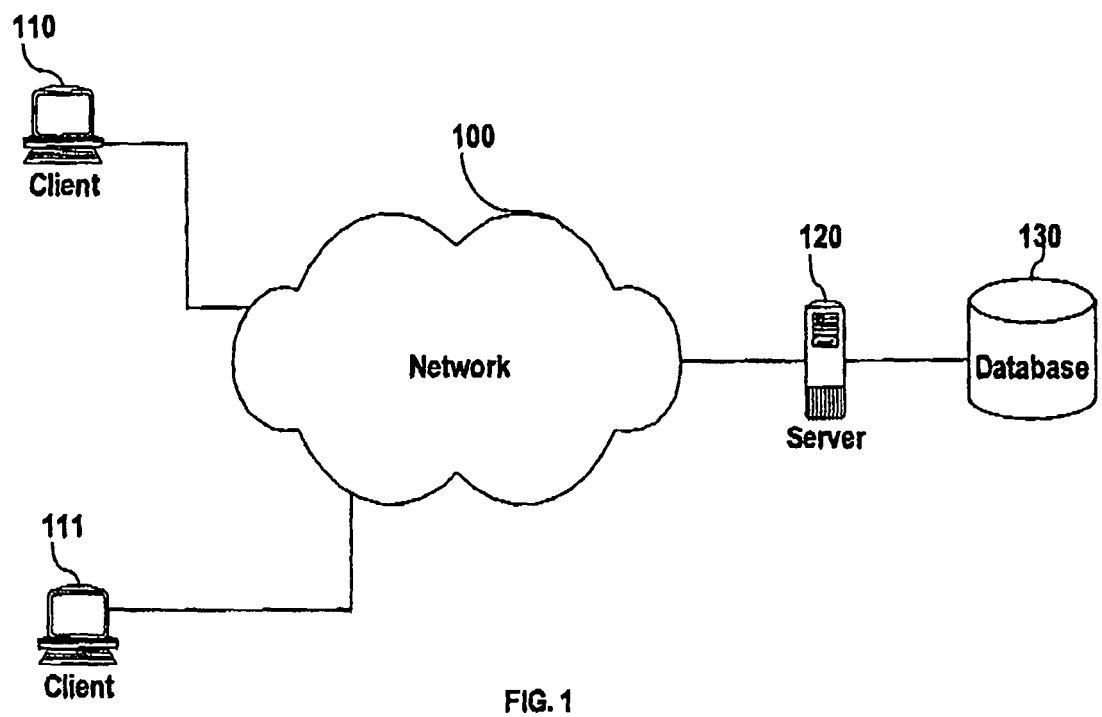
FIG. 1 illustrates a computer network suitable for embodiments of the present invention.

In FIG. 1 there is shown an environment in which embodiments of the invention may be practiced. The server 120 incorporates terminal session software (not shown), a query engine (not shown) and a report engine (not shown), has an associated database 130, which may be a data warehouse or similar data source. The server also incorporates a report authoring application that is used to specify burst specification and to add 'burst' report expression function, an administration application that provides access to 'burst' run options and a content manager application that efficiently filters burst results based on recipient information and current user's credentials. The server 120 is accessed over a network 100, such as the internet or an intranet, by a client computer 110 or 111 that incorporates a thin client application. The client computer 110 or 111 is under the control of a report author (who is a user, not shown). It will be clear that other networks and communications media may be used, and that in some cases, the client and server elements may be geographically co-located, or may even be resident in the same hardware.

Figure 2:
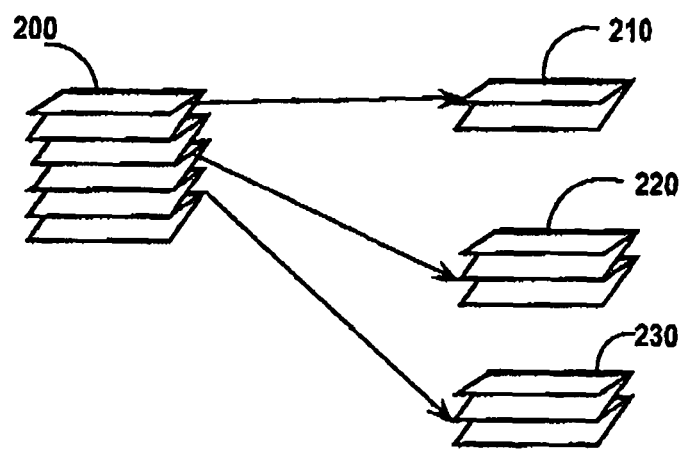
FIG. 2 is a representation of a report and the bursting of a report.

FIG. 2 shows an example of a situation where a single report specification results in the production of a number of versions of the same report, each version customised or aimed at particular user. In this example, the reports are depicted as printer output, but the medium is not critical, and, for example, email versions or soft-copy reports may be produced. A full report 200 is bust into sections 210, 220 and 230 each containing data of interest to a particular recipient or group of recipients. A recipient may be a member of more than one group and therefore might receive different sections of the report.

In embodiments of the invention, in order to burst a report, two additional types of information are required to be specified, burst recipients and keys for bursting, and they are included in a burst specification. A burst recipient is a reference to an item in the query. The burst specification may be stored within the report specification In some embodiments, the burst specification is stored separately.

In some embodiments the key for bung is a reference to a level in the query. Here, 'level' is a term used in describing a query structure. Where the data are grouped the grouping can be nested—e.g. group on country and product-line. Level refers to one of the items in the grouping. For example,
  group by A, B, C
produces a three level hierarchy of C within B within A (A is the highest level, C is the lowest) in a single list.

The order of grouping parameters determines the order in which the results are presented. For example a three level hierarchy can be produced using:
  ... group by COUNTRY, PRODUCT, YEAR
This generates a list where all the rows for CANADA come first followed by GERMANY then RUSSIA—that is alphabetically. Within each country group, the PRODUCT results are ordered such that BUSES come first, followed by CARS then TRAINS again, alphabetically, Then within each group of PRODUCTS results according to YEAR are ordered alphanumerically, i.e. 2000 comes first then 2001 and 2002.

The storage location of the burst specification is not critical as long as the burst specification is available when the report is run or executed. In some embodiments the burst specification is stored within the database 130, in other embodiments a separate store is used (not shown).

In some embodiments, more than one bust specification is stored, with a mechanism to select which burst specification is used in a particular execution or run of a report.

Figure 3:
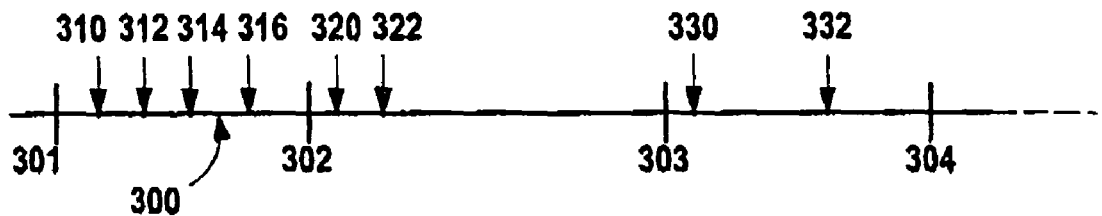
FIG. 3 is a representation of a stream of data resulting from a query.

FIG. 3 represents an arbitrary segment of a stream of data emitted by a database in response to a query produced by an embodiment of the invention. This resultant stream 300 contains the data needed by a report engine to generate reports for users. Embedded in the data are a number of control breaks (defined by a key for bursting 301, 302, 303, 304. These control breaks are recognised when the value of data in the column changes as the rows are examined one by one, starting from the beginning (or top) of the stream. The data between the control breaks includes pieces of data—recipient keys, 310, 312, 314, 316, 320, 322, 330 and 332 each defining one or more recipients or recipient groups. It is possible for an individual recipient to appear directly or indirectly (through a recipient group) in more than one recipient key. The recipients can be individuals like John, Mary, and Fred. The recipients can also be groups like Eastern Managers, Southern Managers, and Northern managers. If John is a member of the Eastern Managers group, then he will receive a burst report for which the recipient includes Eastern Managers i.e. he is referenced indirectly through the group Eastern managers.

The elements of the data stream that are the keys for bursting (also known as control breaks) and those that define the recipients are identified by elements in the burst specification. The association of recipients to a specific burst control break is defined by position of the recipient with respect to the control breaks and their levels within the data stream.

Levels correspond in many cases to the hierachical levels of a business, although this is not necessarily the case. A simple business environment may comprise a business having global regions, countries within those global regions and regions within those countries.

A control break occurs when the value in a sorted field changes from one record to the net. At a control break a report generator prints the subtotal line groups and subheading line groups for the initiating control break and all lower level control breaks (if they exist). Thus, in embodiments of the invention, control breaks delineate sections of the burstable report corresponding to groupings within the report. The recipients that occur within a section are used to determine distribution of the various sections of the report. The control breaks may be chosen to correspond to levels of the business. In this simple case, they permit a report to be burst according to global region, country and region so that different parts of the report can be identified and only sent to those recipients requiring them. In the example, the database contains information like the managers of the various regions and/or countries. The manager information is accessed by the query and the burst specification references it as the burstRecipient.

Figure 4:
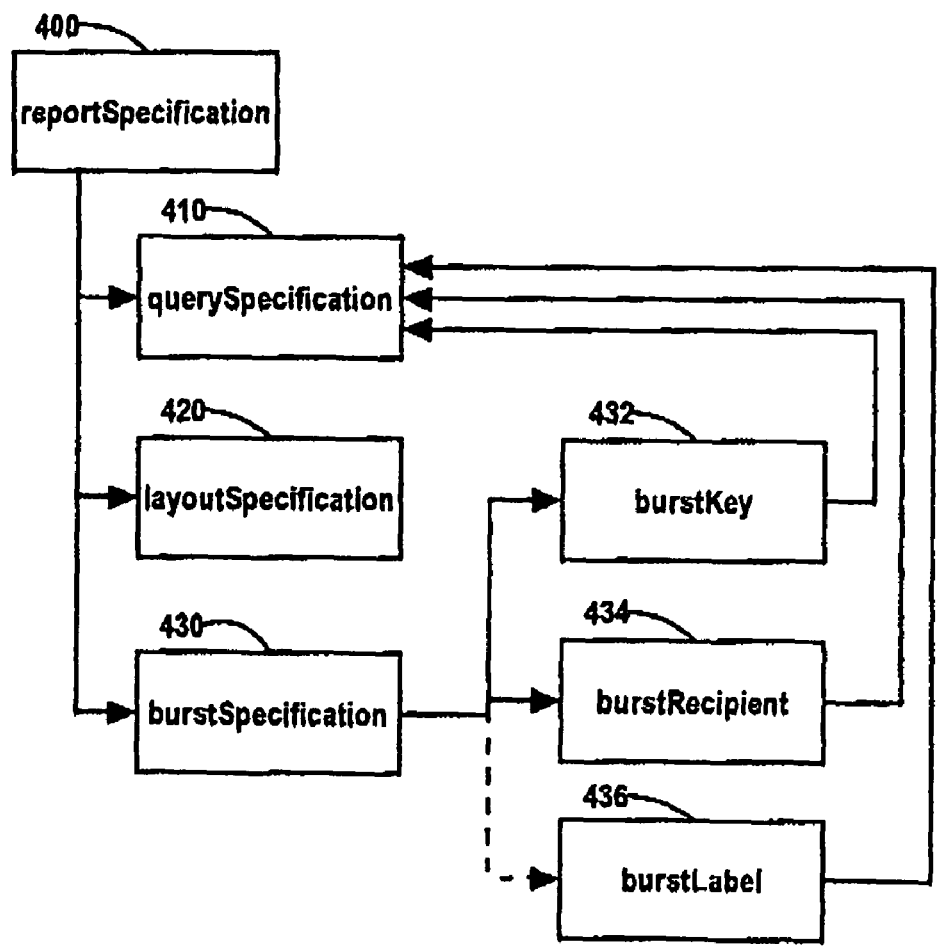
FIG. 4 is a representation of a burst specification.

FIG. 4 represents associations between various elements in one possible schema defining a report specification 400 which comprises a query specification 410, a layout specification 420 and a burst specification 430. In turn the burst specification 430 comprises one or more burst keys 432, one or more burst recipients 434 and optional burst labels 436. Each element present in the burst specification is a reference to an element in the query specification 410.

Embodiments of the invention are further illustrated by examples. In a first example, the burst specification contains the following information:
  burstKey=Country ;defines column which is the key for bursting
  burstRecipient=Manager ;defines the column containing the recipients
  The sample query code fragment is as follows:
  Select Country, Product, ... , Manager from
    <table_specification>
    group by Country
  Note that both Country and Manager are integrated into the query as parameters. In the case of Manger, it is simply a column in the result (see below). Note that is some circumstances this column might not have been otherwise required since the resulting business report did not include this data. In the case of County, the item appears as a parameter of the group on clause of the query, since that will produce the required result. Note further that since there is only one item in the Group on clause, the hierarchy has only a single level. The stream resulting from a database comprises data that is conveniently represented in tabular form as follows:

| Country | Product | Manager | burst |
|---------|---------|---------|-------|
| Canada | Tents | John | B1 |
| Canada | Tents | Jim | |
| Canada | Sleeping bags | John | |
| Canada | Camp stoves | Fred | |
| Mexico | Tents | John | B2 |
| Mexico | Sleeping Bags | Arthur | |
| USA | Bicycles | Mary | B3 |
| USA | Cars | Mary | |
| USA | Cookers | Fred | |

Taking the information in the burst specification with the data resulting from the query, three distinct reports are produced, as shown in the column Burst (not pan of the table produced by the query), B1, B2 and B3. Each of these distinct reports is then sent to the Managers whose names appear within that stream of data. i.e., the fist distinct report is sent to John, Jim and Fred, the second to John and Arthur, and the third to Mary and Fred.

A second example, using similar data, but this time it makes use of the level of each field within a hierarchy. The effect of the hierarchy is to vary how the breaks occur and which column is used to define the burstRecipient. The burst specification contains the following information:

burstKey=Country
burstRecipient=MgmtGroup

Note that other forms of equivalent syntax can be used for the burst specification. And the query code fragment is:

Select MgmtGroup, Country, Product, . . . , from
  <table_specification>
  group by MgmtGroup, Country, Product Note that MgmtGroup now appears in the query as a parameter of the 'group by' clause of the query. The steam resulting from a database comprises data that is conveniently represented in tabular form as follows:

| MgmtGroup | Country | Product | burst |
|-----------|---------|---------|-------|
| Western | Canada | Camp stoves | B1 |
| Western | Canada | Sleeping bags | |
| Western | Mexico | Tents | B2 |
| Western | USA | Tents | B3 |
| Western | USA | Sleeping Bags | |
| Eastern | Canada | Tents | B4 |
| Eastern | Mexico | Bicycles | B5 |
| Eastern | USA | Cars | B6 |
| Eastern | USA | Cookers | |

Note that in this case the burst recipients (MgmtGroup) do not change when the burstKey (Product) changes. This is a scenario in which the recipients are part of the grouping structure but at a higher level than the burst key. In this case, a burst report (B1 to B6) is produced each time the burst key value changes but the recipient is determined by the most recent value rather than each value that occurs within a burst report.

Embodiments of the invention are next described with reference to an object-oriented system. Those skilled in the art would be aware that other environments may be used In some embodiments of the invention, an object model defines an execute method along with various run-time options. One of these run-time options is a Boolean variable called 'burst'. The burst specification in a report will be processed only when 'burst'='true' is specified in the execute request, otherwise the burst specification is ignored and the report runs as any other report.

When a report executes in burst mode (That is, when the 'burst' Boolean is 'true'), the report engine monitors the level defined by the burst key. Whenever a control break (also known as a Group break) occurs on the burst key level, a burst report is produced from whatever data has been processed to that point. The report engine also monitors the item identified by the burst recipient. The burst report is distributed to the recipients associated with the current burst key group.

An identifier having a unique value is mandatory for each burst instance. In one embodiment of the invention, a default for this unique value is generated by concatenating the value of the firs item in the burst key level with the first item in all preceding levels. The character '/' is used to separate each value, although other characters may be used. The default burst instance identifier may be overridden by specifying, in the burst specification item or column from the query to be used as the label. However, this might yield non-unique or even empty values, resulting in failure to produce the expected result, since the burst instance identifier is a label in the user interface to differentiate one burst instance from another, and, although feasible, such an approach is not preferred.

In some embodiments the reports are able to reference line numbers in the result set, and in these situations, the line number is reset to 1 at the start of each burst report In some embodiments a distribution option for each recipient is provided for, so that (for example) reports may be emailed, printed or saved for the recipients as required. The distribution option is specified as part of the execute request. In other embodiments, for more dynamic behavior, the distribution options are part of the query result. For example, the query result might contain information for each burst recipient That identifies how the burst report should be delivered to that recipient.

The 'burstKey' element references a level in a query within the querySpecification. Every control break on this level generates a new burst report. A control break is used to define the end of one sub-report and the beginning of the next sub-report. If the query referenced by the burstKey element results in a crosstab, an error message is produced.

The 'burstLabel' element is optional. It references an item whose value is used to differentiate one burst output from another. If none is specified, a label is generated automatically as described earlier.

The 'burstRecipient' element references an item in a query whose values are used as the recipients of a burst report. The element may also contain other information that specifies how to interpret the value of the recipient item or to identify the mode by which the burst report should be distributed to the recipient, for example by email or by printed copy.

Figure 5:
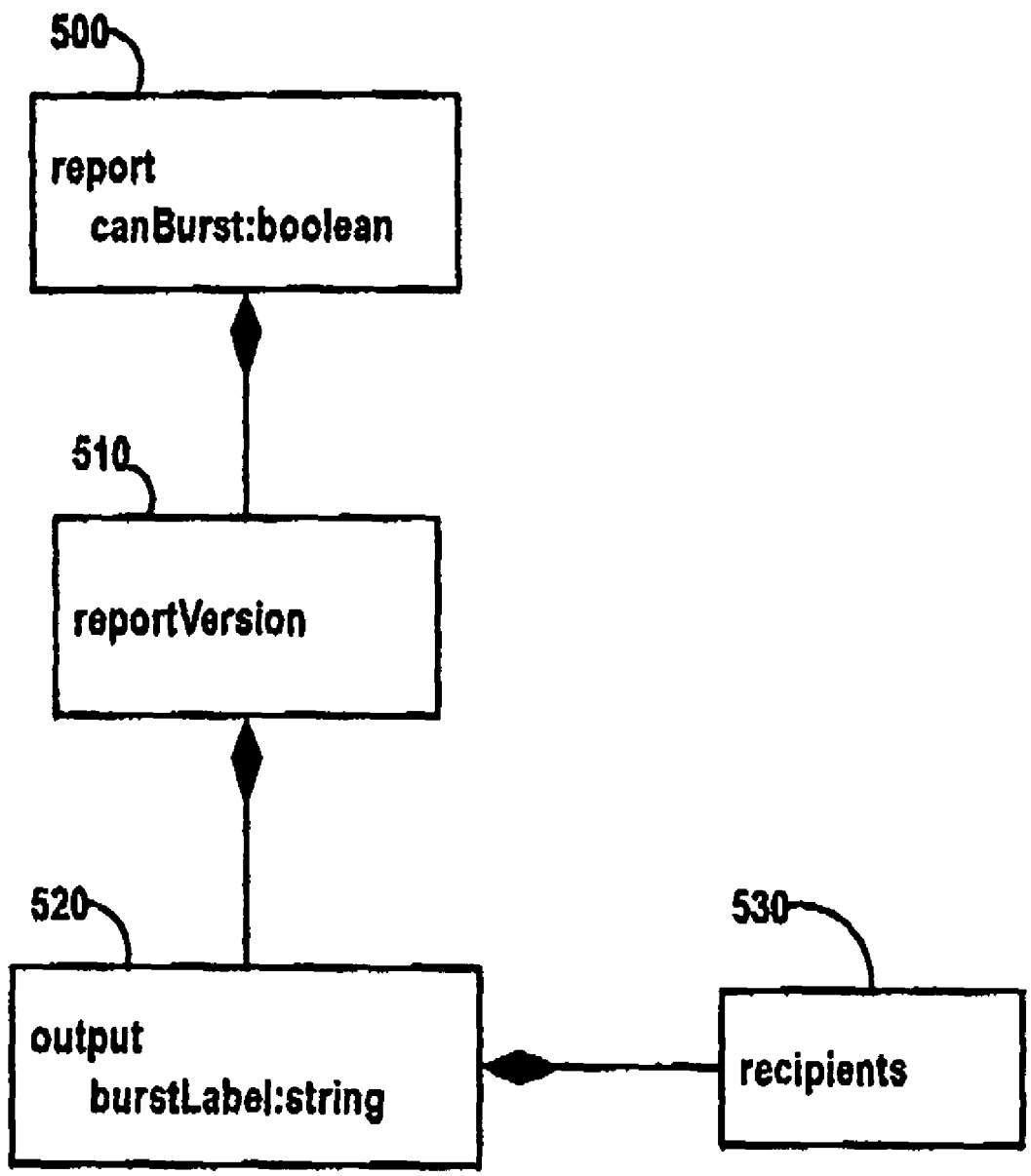
FIG. 5 presents an object model that will support storing of burst output.

We next turn to FIG. 5 which depicts the objects involved and their relationships using a simple form of a relationship diagram. In some embodiments of the invention a Boolean 'canBurst' attribute in the report object 500 indicates whether the report is burstable. This attribute reflects the presence of a burst specification in the underlying report specification. The attribute is used to optimize burst processing by avoiding the necessity of posing the report specification to determine if a burst specification exists.

The burst label generated for each burst output is stored in the output object 520 under the attribute 'burstLabel'. The burst specification 'burstLabel' is used to generate the 'burstLabel' attribute. Here, the 'burstLabel' is used as a label to assist in differentiating one burst output from another. It is not guaranteed to be unique and may not even to be specified. The output object includes a list of recipients called 'recipients' that are references to objects of type account, group, role, contact and distribution list. The list of recipients is used as a form of filter controlling access to the output object.

When the content manager application receives a request to access output objects 520 under a reportVersion object 510, the results are filtered if a recipient list 530 is present. In order to be able to see an output object 520, the current user must be referenced by one of the objects in the recipient list 530. The user that created the output object 520 always has access to the output object regardless of the state of the recipient and email lists.

A report expression function 'burst' returns a Boolean value that corresponds to the value of the 'burst' run option. This allows the report author to produce conditional rendering based on whether a report is being burst or not.

FIG. 6(a) is an example of a flowchart of an embodiment of the invention. The process starts 600 and a query to select the data for the report is defined 605. A burst specification is also defined and stored 610 for subsequent use. The changes necessary to permit the burst specification to be used are integrated into the query 615, and the query sent to the data source. The incoming data stream from the data source is then parsed according to the query 625 and the resulting report is burst using the burst specification and the data contained in the incoming data stream 630.

Figure 6:
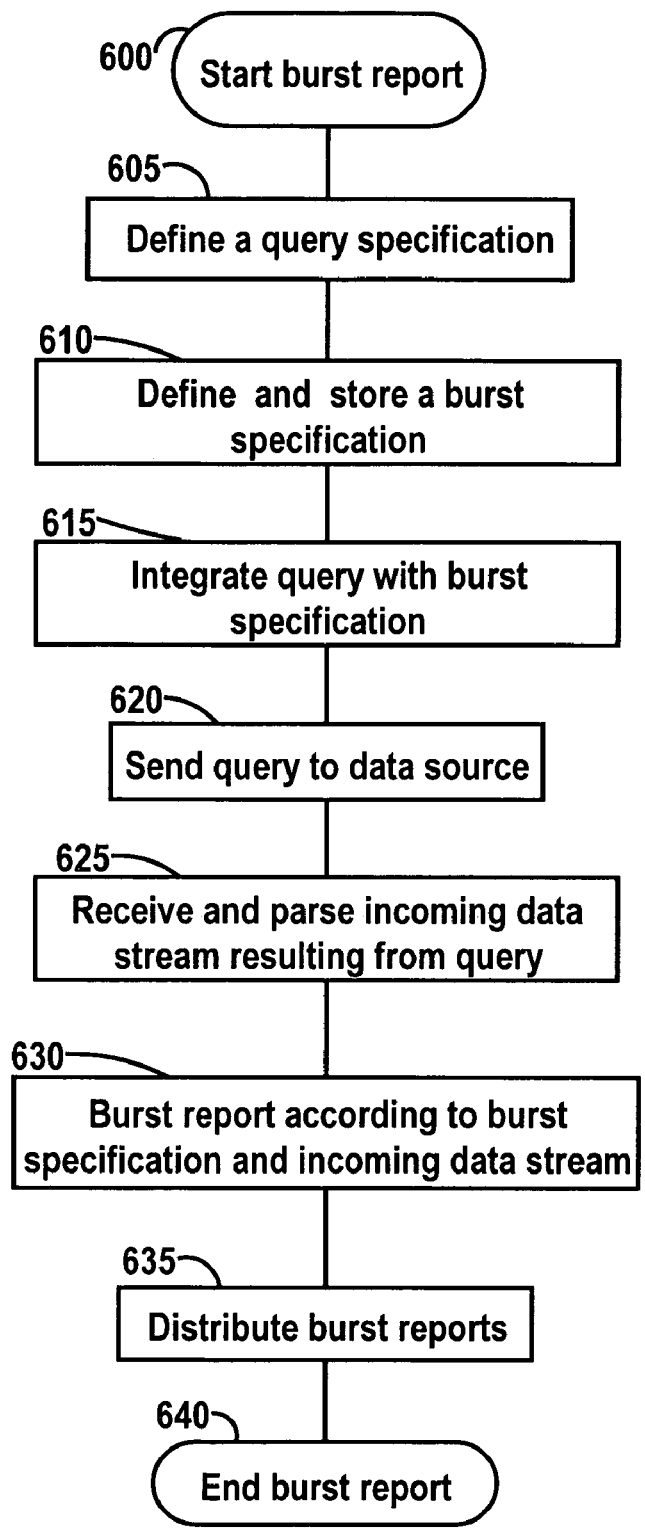
FIG. 6($a$) is a flowchart showing the sequence of operations in one embodiment of the invention.
Figure 6:
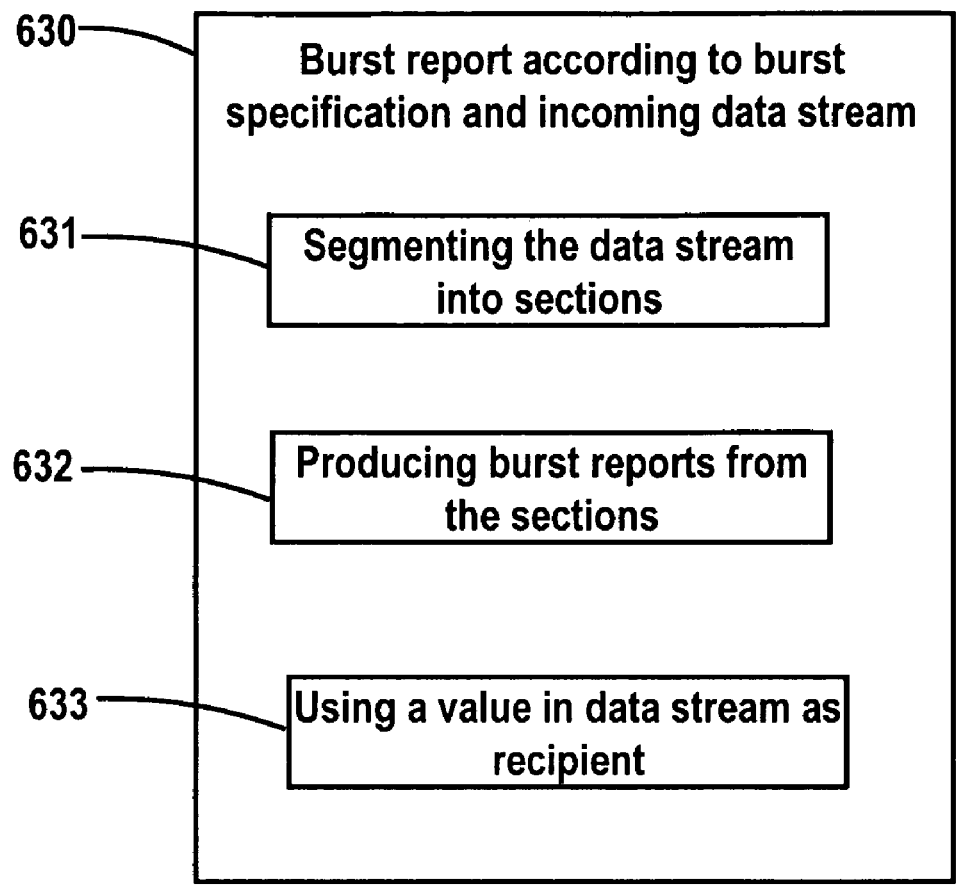

FIG. 6 (b) shows the steps when a report is "bursted" according to the burst specification and incoming data stream. The data stream is segmented into sections 631, burst reports are produced from the sections 632 and a value in the data stream is used as recipient 633. The resultant burst reports are then distributed, according to the recipients' needs 635 and the report session ends 640. This process may be instigated by a batch task, or be part of an interactive user session.

Embodiments of the invention can be implemented in digital electric circuitry or in computer hardware, firmware, and software or in combinations thereof. Apparatus of the present invention can be implemented in a computer program product glibly embodied in a machine-readable storage device for execution by a programmable processor. The method of the present invention can be performed by a programmable processor executing a program of instructions to perform the functions of the invention by operating on input data and generating output.

Many alterations and modifications may be made by those having ordinary skill in the art without departing from the spirit and scope of the invention. Therefore, it must be understood that the illustrated embodiments have been set forth only for the purposes of example, and that it should not be take as limiting the invention as defined by the following clams. The following claims are, therefore, to be read to include not only the combination of elements which are literally set forth but all equivalent elements for performing substantially the same function in substantially the same way to obtain substantially the same result. The claims are thus to be understood to include what is specifically illustrated and described above, what is conceptually equivalent, and also what incorporates the essential idea of the invention.

What is claimed is:

1. A method for creating and distributing burst reports comprising:
   a) defining a query specification and a burst specification, the query specification having a query, the query including a hierarchy level and an item; the burst specification having a burst key and a burst recipient; the burst key referring to the hierarchy level, the burst recipient referring to the item;
   b) generating a data stream from a data source using the query, the item in the query resulting in a value in the data stream;
   c) embedding a plurality of break keys at locations in the data stream based on the burst specification; wherein the locations of the plurality of break keys and the value define a grouping hierarchy of the data stream;
   d) segmenting, by at least one computer, the data stream into sections, the sections being defined by the plurality of break keys and having the value;
   e) producing a plurality of burst reports from the sections;
   f) using the value as a recipient for the burst reports; and
   g) distributing the plurality of burst reports to the recipient.

2. The method of claim 1 wherein the break keys are control breaks.

3. The method of claim 1 wherein the grouping hierarchy comprises a plurality of levels.

4. The method of claim 3 wherein the plurality of levels corresponds to levels of a business.

5. The method of claim 1 wherein the burst key defines a column in a query.

6. The method of claim 1 wherein the burst recipient defines a column including recipients.

7. The method of claim 1 wherein the recipient is determined by a most recent value.

8. The method of claim 1 wherein the burst recipient includes information for interpreting the value.

9. The method of claim 1 wherein the burst recipient includes information for a distribution mode of the burst reports.

10. The method of claim 1 wherein the burst specification further comprises a burst label for differentiating one burst report from another burst report.

11. A storage medium readable by at least one computer encoding a computer program for execution by the at least one computer to carry out a method for creating and distributing burst reports, for use in a business intelligence system, the computer program comprising:
    a) code means to define a query specification and a burst specification, the query specification having a query, the query including a hierarchy level and an item; the burst specification having a burst key and a burst recipient; the burst key referring to the hierarchy level, the burst recipient referring to the item;
    b) code means to generate a data stream from a data source using the query, the item in the query resulting in a value in the data stream;
    c) code means to embed a plurality of break keys at locations in the data stream based on the burst specification; wherein the locations of the plurality of break keys and the value define a grouping hierarchy of the data stream;
    d) code means to segment from the data stream into sections, the sections being defined by the plurality of break keys and having the value;
    e) code means to produce a plurality of burst reports from the sections;
    f) code means to use the value as a recipient for the burst reports; and g) code means to distribute the plurality of burst reports to the recipient.

12. The storage medium of claim 11 wherein the burst recipient defines a column including recipients.

13. The storage medium of claim 11 wherein the burst recipient includes information for interpreting the value.

14. The storage medium of claim 11 wherein the burst recipient includes information for a distribution mode of the burst reports.

15. The storage medium of claim 11 wherein the burst specification further comprises a burst label for differentiating one burst report from another burst report.

16. A business intelligence system to create and distribute burst reports, comprising:
- at least one computer, wherein the at least one computer is configured to:
  - a) define a query specification and a burst specification, the query specification having a query, the query including a hierarchy level and an item; the burst specification having a burst key and a burst recipient; the burst key referring to the hierarchy level, the burst recipient referring to the item;
  - b) generate a data stream from a data source using the query, the item in the query resulting in a value in the data stream;
  - c) embed a plurality of break keys at locations in the data stream based on the burst specification; wherein the locations of the plurality of break keys and the value define a grouping hierarchy of the data stream;
  - d) segment the data stream into sections, the sections being defined by the plurality of break keys and having the value;
  - e) produce a plurality of burst reports from the sections;
  - f) use the value as a recipient for the burst reports; and
  - g) distribute the plurality of burst reports to the recipient.

17. The business intelligence system of claim 16 wherein the burst recipient defines a column including recipients.

18. The business intelligence system of claim 16 wherein the burst recipient includes information for interpreting the value.

19. The business intelligence system of claim 16 wherein the burst recipient includes information for a distribution mode of the burst reports.

20. The business intelligence system of claim 16 wherein the burst specification further comprises a burst label for differentiating one burst report from another burst report.

* * * * *